Nov. 18, 1969 J. P. SITARIK 3,479,464

CALL REROUTE DISABLING EQUIPMENT

Filed June 14, 1966 8 Sheets-Sheet 1

INVENTOR
J. P. SITARIK
BY [signature]
ATTORNEY

Nov. 18, 1969 J. P. SITARIK 3,479,464

CALL REROUTE DISABLING EQUIPMENT

Filed June 14, 1966 8 Sheets-Sheet 6

United States Patent Office 3,479,464
Patented Nov. 18, 1969

3,479,464
CALL REROUTE DISABLING EQUIPMENT

Joseph P. Sitarik, Allentown, Pa., assignor to Bell Telephone Laboratories, Incorporated, Murray Hill, N.J., a corporation of New York Filed June 14, 1966, Ser. No. 557,545
Int. Cl. H04m 3/00
U.S. Cl. 179—18 9 Claims

ABSTRACT OF THE DISCLOSURE

Equipment is disclosed which is controllable by a subscriber for causing incoming calls addressed to the subscriber number to be automatically rerouted to a preselected different station. Apparatus is also included which may be activated by a calling subscriber for disabling the equipment to temporarily cancel call reroute and to permit extension of a call to the called subscriber station instead of the different station.

Figures 1, 2:
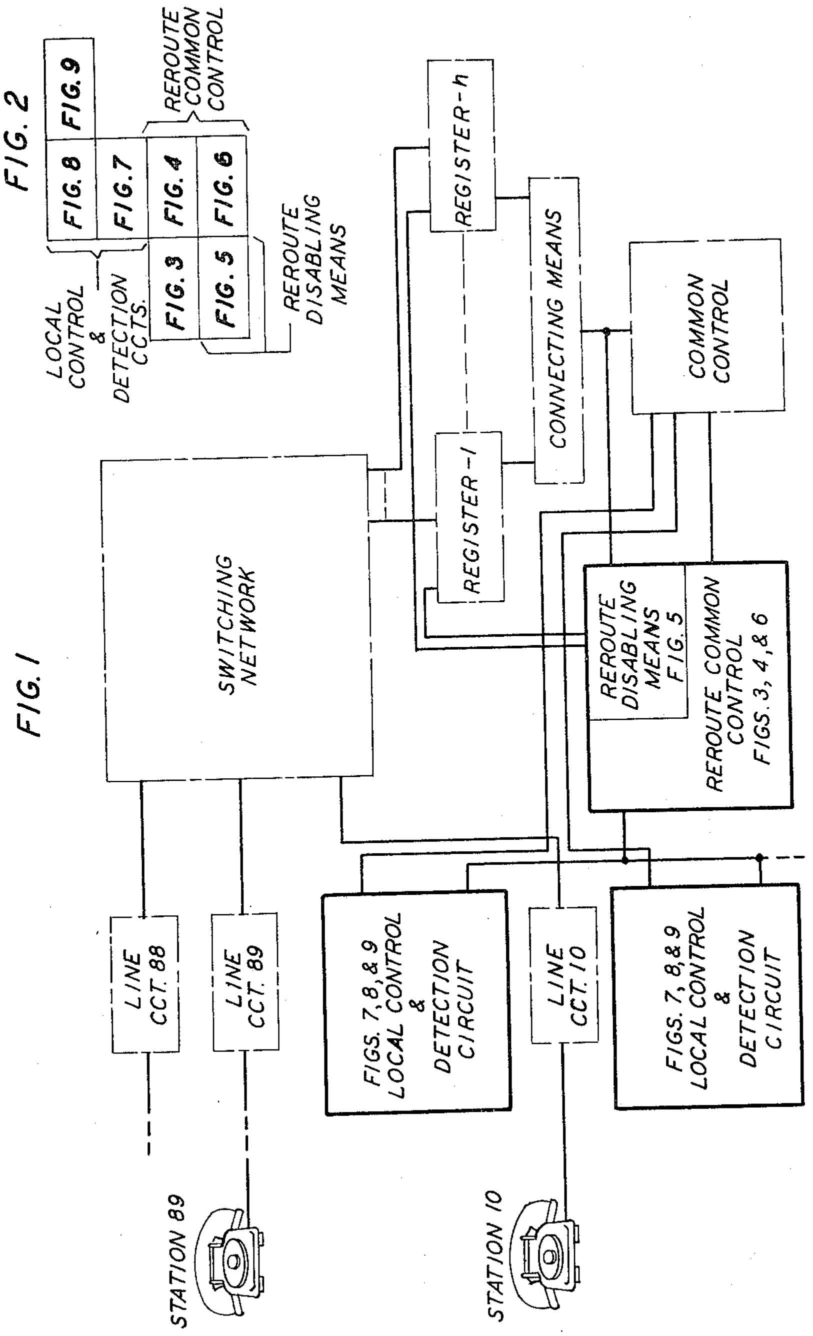

This invention relates to automatic switching systems and, more particularly, to such a system wherein a subscriber may cause incoming calls addressed to his own station number to be automatically rerouted to a preselected different station.

Call reroute, as it is termed herein, has been identified in various ways, some of which are call transfer and call forwarding. Regardless of the name given prior systems they are generally grouped with relation to the reroute control mechanism into at least two groups.

One group concerns step-by-step switching systems wherein the reroute control is generally provided at the subscriber station. Incoming calls are normally switched through the switch train to the station. When the incoming call is connected to the dialed station, the reroute control is activated. This activated control seizes the outgoing train and outpulses a station address. Thereafter the incoming and outgoing circuits are interconnected at the station by the reroute control.

Another group concerns automatic switching systems where the approach to call rerouting is more direct. The subscriber desiring call reroute controls the switching system to reroute all incoming calls to a preselected station. In recent systems the address of the preselected station is stored in a changeable memory to which the controlling subscriber is given access.

To implement call reroute in some automatic switching systems the terminating connections are tested to determine if the address of the rerouted or controlling station has been dialed. If that address is detected the stored preselected station address is substituted for that dialed address and the call is rerouted by the common control.

The instant invention is concerned with the problems of call rerouting in such an automatic switching system. One of the significant drawbacks solved by this invention concerns the following situations.

Subscribers have the common human failing of forgetting that they have previously placed the home station in a reroute condition. Very often a subscriber returns from the location to which his calls were transferred and resumes his affairs oblivious to the fact that all incoming calls are still being rerouted. Until the subscriber takes affirmative action to restore the home station to normal or, if provided, some limiting interval timer operates, the subscriber receiving the rerouted calls is unable to contact the home station or effect a change in the reroute condition.

Still another situation grows out of the common PBX practice of allowing more than one subscriber to share the same telephone number. Any one of the partners of that telephone number may cause a call reroute so that all subsequent incoming calls directed to the station are rerouted to a different station. Under these reroute conditions the sharing partners are denied proper telephone service until the home station is restored to normal service.

It is the primary object of this invention to overcome the above drawbacks in the prior system.

It is a second object of this invention to overcome the prior system drawbacks by temporarily disabling call reroute.

It is a further object of this invention to cause the temporary disabling of call reroute by a signal.

It is a further object of this invention to overcome the prior system drawbacks by allowing any subscriber to implement the temporary disabling of call reroute.

It is a further object of this invention to implement the call reroute disabling function by a signal which is normally convenient to any subscriber.

It is a further object of this invention to provide a convenient mode for activating the disabling function by allowing the disabling signal to be transmitted along with the dialed address.

It is a further object of this invention to restrict the effect of the disabling signal by allowing this signal to effect only the same continuous connection requested by the subscriber transmitting the signal.

It is a further object of this invention to restrict the effect of the disabling signal by providing the disabling feature in such a manner as not to change the normal call reroute for subsequent connections made after the call reroute is disabled on a particular connection.

It is a further object of this invention to cancel the effect of the disabling signal when this signal is not followed by a subscriber station address.

It is a further object of this invention to accomplish the disabling of call reroute by allowing the disabling signal to disassociate the call reroute system from the normal switching system for the entire period of a terminating connection.

It is a further object of this invention to accomplish each of the above objects in a normal switching system in a manner which creates the least disturbance to the existing circuit functions.

In accordance with this invention, arrangements are provided to permit any calling subscriber to dial a reroute disabling code prior to dialing the station code of the rerouted station. These arrangements include the operations of both a common register and a common marker circuit, each of which is part of the common control switching system. Upon request of the calling subscriber, the register is connected by the marker circuit to the calling subscriber line to record the transmitted code. After receipt of the reroute disabling code the register is attached to the marker circuit. Associated with the marker circuit is a common reroute control circuit which detects the reroute disabling code. This control circuit records in a resettable storage device a mark to identify the register attached to the marker, resets the register to dial tone mode and signals the marker circuit to release.

If the register circuit is released before a subsequent connection to the marker, the storage device is reset to normal, thus destroying the stored reroute disabling mark.

On a subsequent register connection to the marker providing no break in the off-hook continuity of the register circuit not including the breaks caused by dial pulses, the common reroute circuitry uses the stored reroute disabling mark to prevent the call reroute circuit from interfering with the connection to the called subscriber. After the connection is established the storage device is reset to normal.

A feature of this invention relates to the provision of reroute disabling means for disabling the call reroute circuit.

Another feature of this invention relates to the provision of control means as a part of the reroute disabling means for temporarily disabling the call reroute circuit.

Another feature of this invention relates to the provision of reroute disabling means controllable by a calling station for disabling the call reroute circuit.

Another feature of this invention relates to the provision of reroute disabling means for disabling the call reroute circuit during an override terminating connection.

Another feature of this invention relates to the provision of means under control of a disabling signal for activating the reroute disabling means.

Another feature of this invention relates to the provision of terminative means for deactivating the control means after an override terminating connection.

Another feature of this invention relates to the provision of a resettable storage device for storing a reroute disabling mark.

Another feature of this invention relates to the provision of a detection means and a steering means whereby the detection means detects the disabling signal and the steering means directs the output of the detection means to a particular storage device.

Another feature of this invention relates to the provision of resetting means for resetting the storage device when the associated register is disconnected from the calling subscriber.

Another feature of this invention refers to the preliminary operation of the register and common switching system whereby the reroute disabling code is recorded and the register is restored to the dial tone mode.

Another feature of this invention relates to the provision of resetting means for resetting the storage devices after an override termination connection.

Another feature of this invention relates to the provision of restoring means for resetting a register to a dial tone mode after receipt of a disabling signal.

To teach this invention, a particular call reroute arrangement has been selected and integrated with one embodiment of a reroute disabling control. The selected call reroute arrangement is typically of the type used in common control switching systems and is exemplary of various well known arrangements which can be easily adapted to work with this invention.

The chosen call reroute arrangement is divided into two dependent circuits which are entitled local control and detection, and reroute common control. One local control and detection circuit is associated with each station capable of establishing circumstances under which call reroute is effective. This circuit provides a memory for storing the preselected remote station, means for removing or adding information in the memory, and detection means activated while a terminating connection is being processed for identifying a call directed to this station.

The reroute common control monitors and alters the switching system common control operation. This common reroute circuit cooperates with one local control and detection circuit at a time to control the storing or erasing of a remote station number, to alter the routing instructions of the switching system common control to accomplish a call reroute, or to temporarily disable the call reroute function.

In this arrangement, the base station refers to the station having the capability of causing a reroute effecting calls directed to this same station. Remote station address refers to the station address stored in a local control and detection circuit, and therefore to the address to which rerouted calls are directed.

A base station desiring to have subsequent incoming calls rerouted to a remote station dials into a register a special code identified with call reroute service. This code is translated and recorded in a memory by the reroute common control. Thereafter the register is restored to normal, i.e. the special code stored in the register is erased and dial tone is returned. This second dial tone signals the base station to dial the address code of the remote station. When dialing is complete the register is attached to the marker circuit, part of common control, for what initially appears to be a terminating connection. However, the special code dialed earlier and stored by the reroute common control halts the normal marker circuit operation. The reroute common control proceeds to manipulate the marker circuit to determine the identity of the base station in order to select the appropritae local control and detection circuit, and to transfer the remote station address code from the register circuit to the storage units of the local control and detection circuit. When these functions are complete the call reroute feature is effective and the base station is placed on stand-by.

The necessity of rerouting a particular terminating connection is determined by the local control and detection circuit. For every base station on stand-by, the associated reroute local control and detection circuit is actively monitoring the operation of the marker circuit when that circuit is handling a terminating connection. Each of these local circuits is arranged to detect a register request for a terminating connection destined for completion to the associated stand-by station. When such a request is detected the local control and detection circuit transmits a signal to the reroute common control to alter the marker circuit operation. Thereafter the reroute common circuit controls the register in order to prevent the register from transmitting the called station address code to the marker, and signals the local control and detection circuit to transmit to the marker the stored remote station address code. The marker proceeds to the selection of a path between the remote station and calling station in a normal manner.

Another feature of the invention is the provision of a storage device for storing the reroute disabling code in the reroute common control.

Another feature of this invention is the provision of disabling means common to all local control and detection circuit detection means.

Another feature of this invention is the provision of a bistable device as a means for storing the reroute disabling code.

Another feature of this invention is the provision of a resetting circuit for restoring to the normal state any bistable memory device.

Another feature of this invention is the provision of a bistable device which is set by, and common to, all bistable memory devices to inhibit the detection means of each local control and detection circuit.

Another feature of this invention is the provision of an inhibiting transistor gate associated with each detection means which is turned on in parallel with a plurality of other inhibiting gates.

Figure 3:
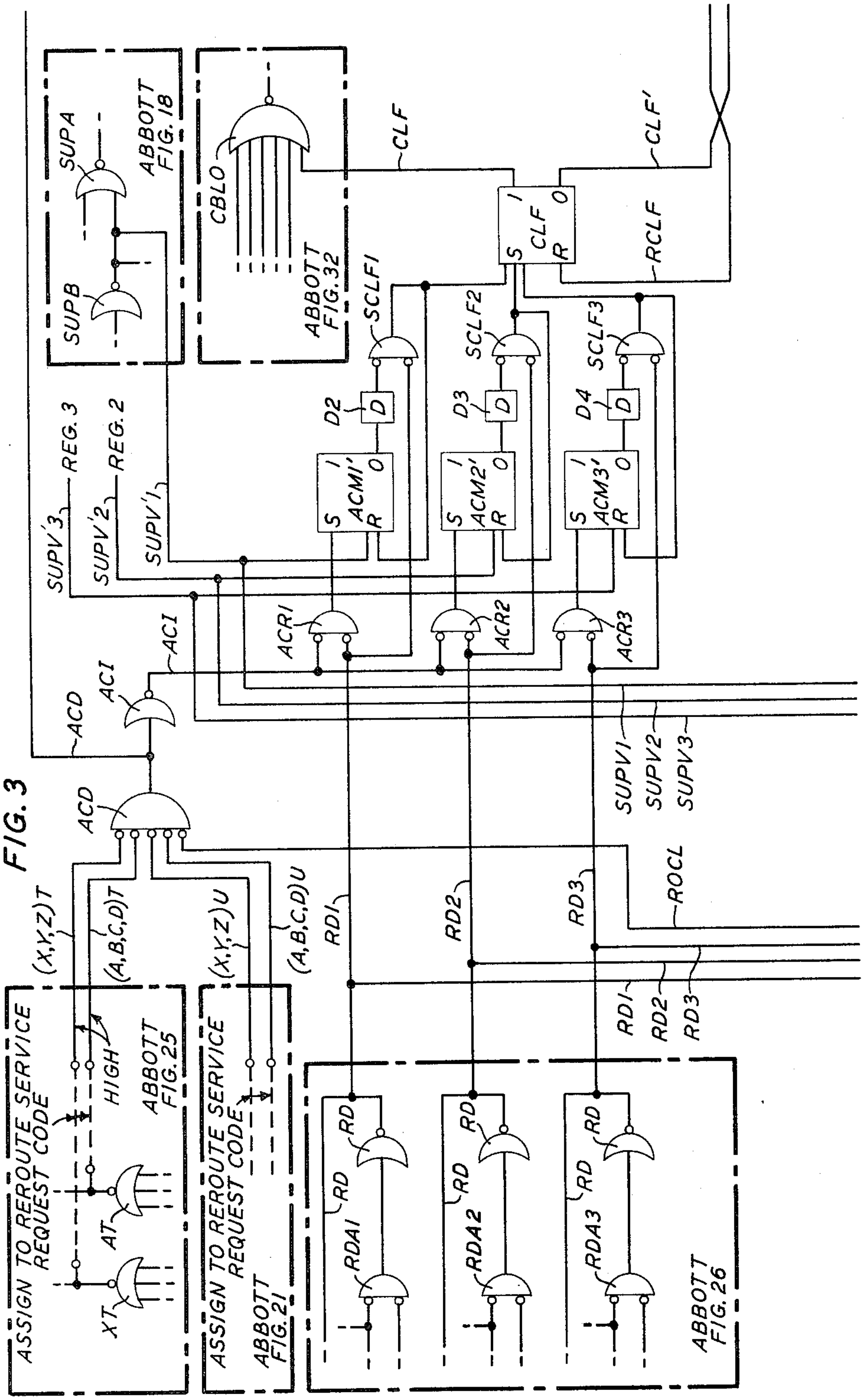
Figure 4:
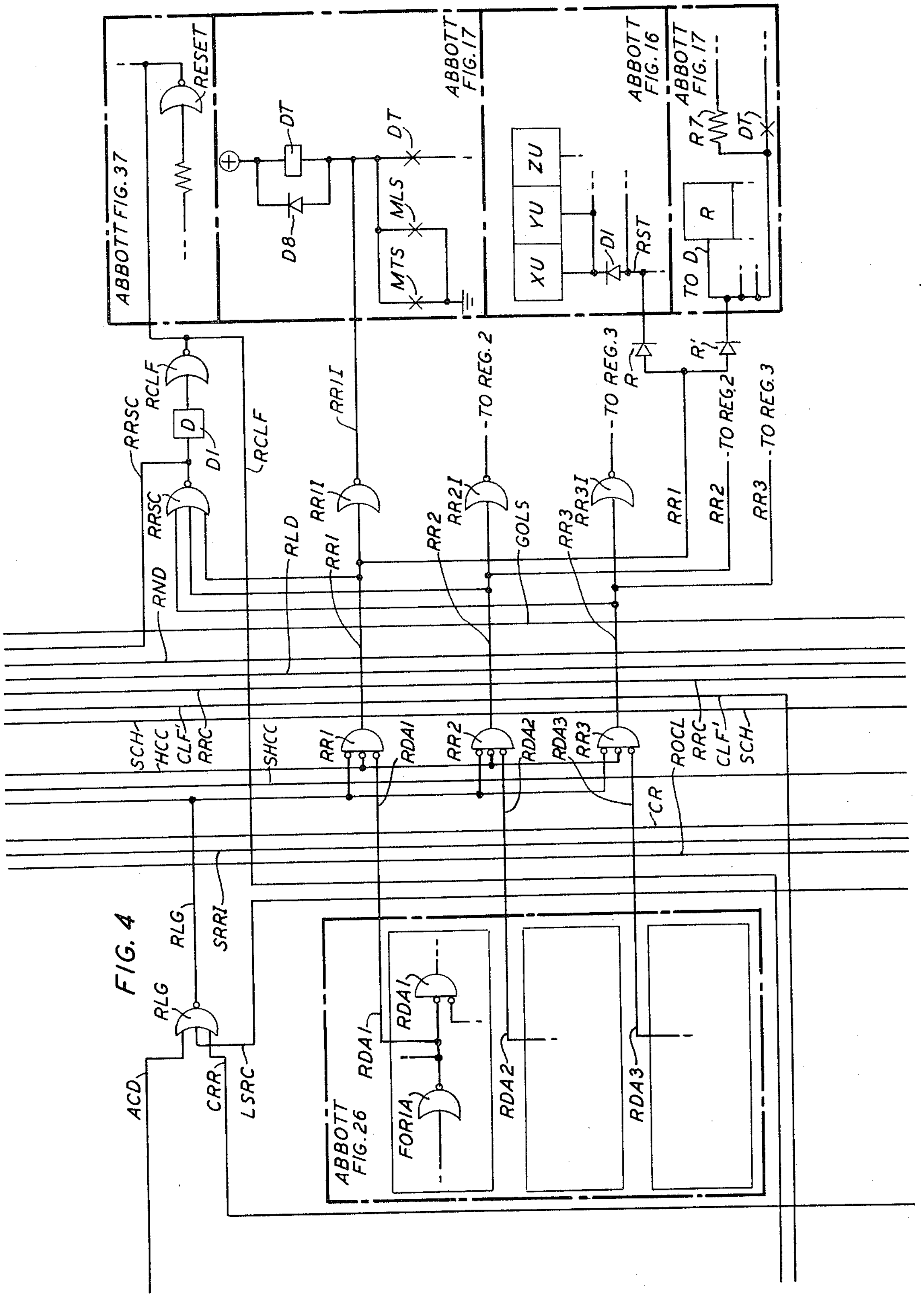
Figure 5:
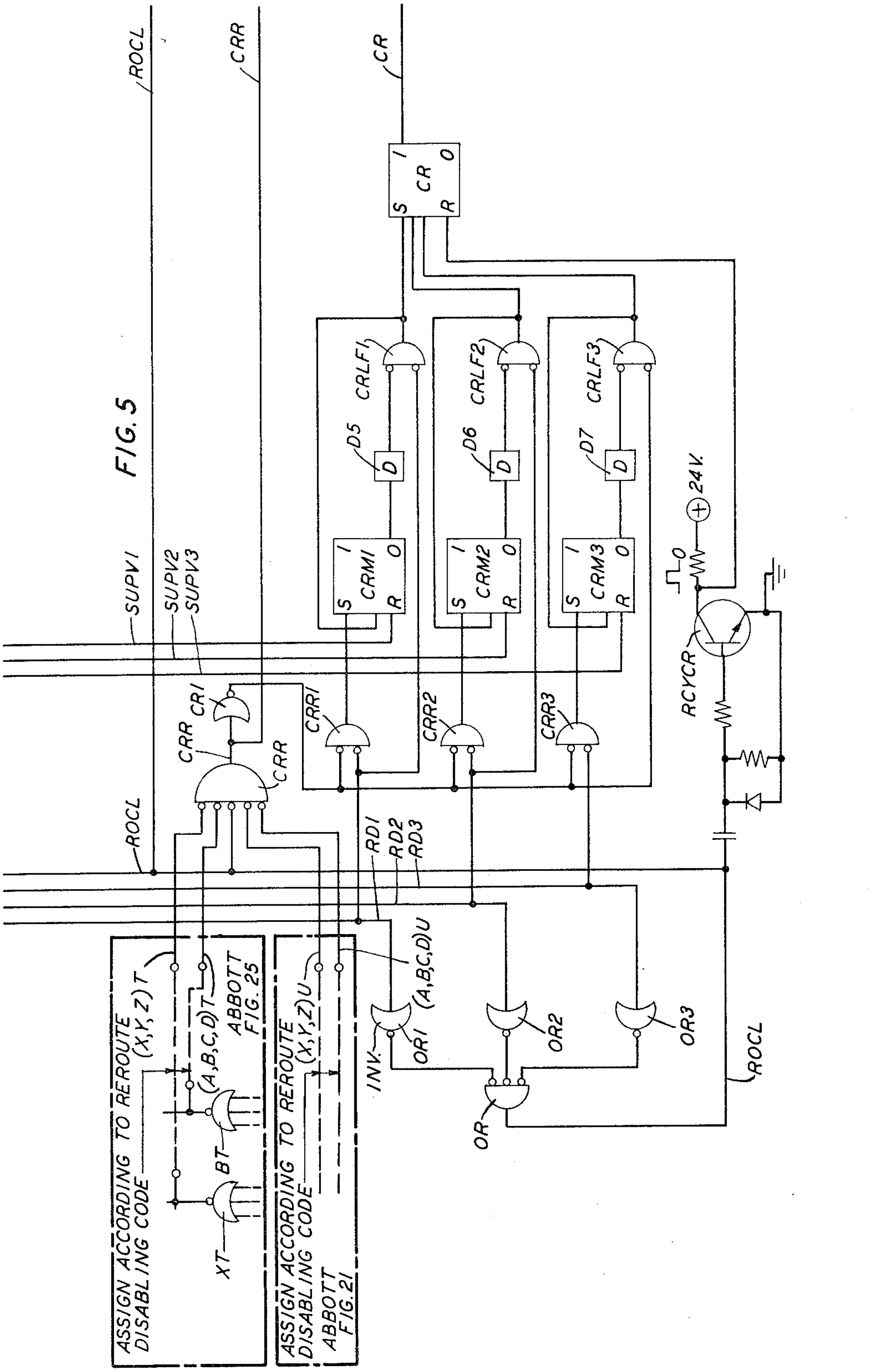
Figure 6:
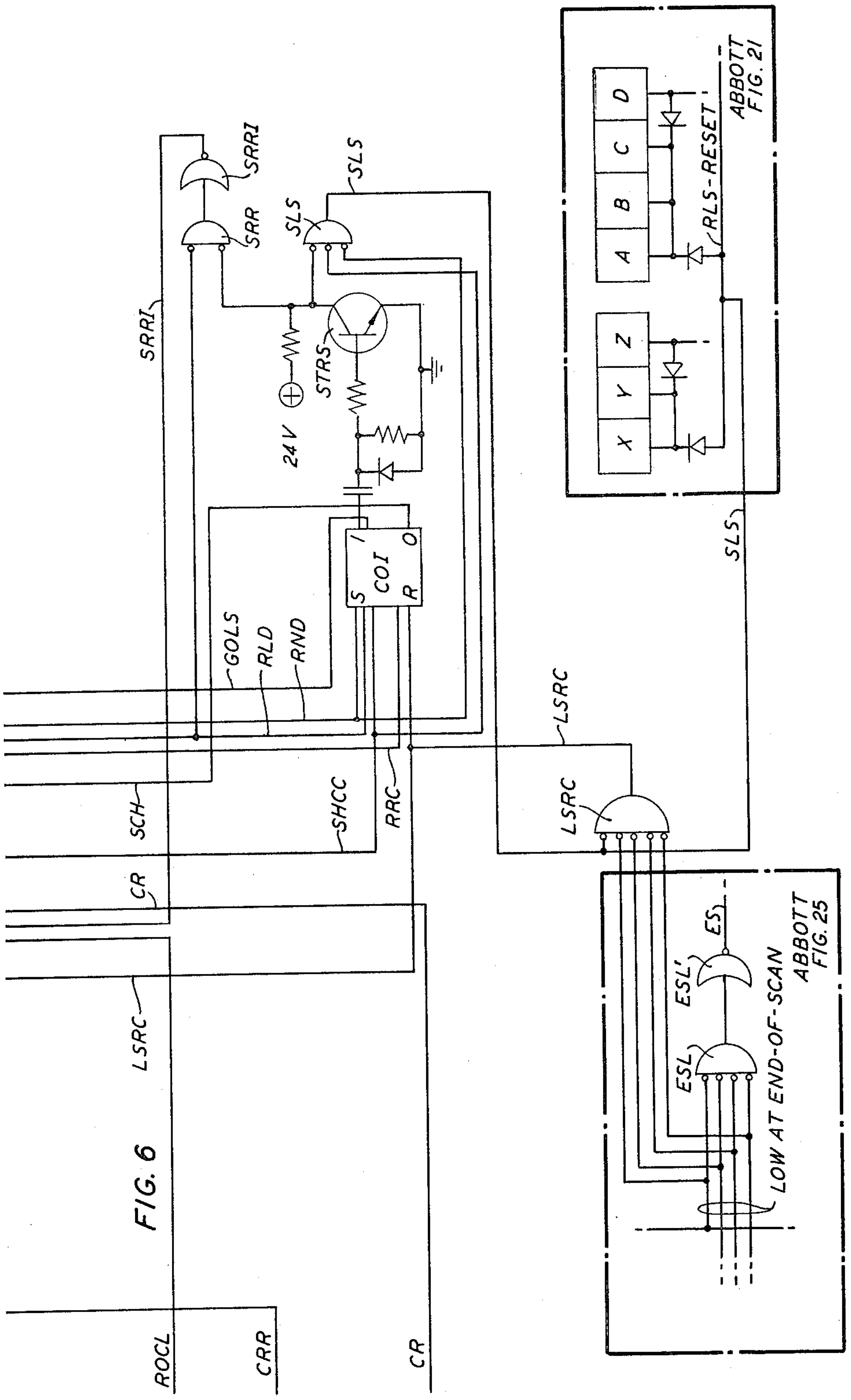
Figure 7:
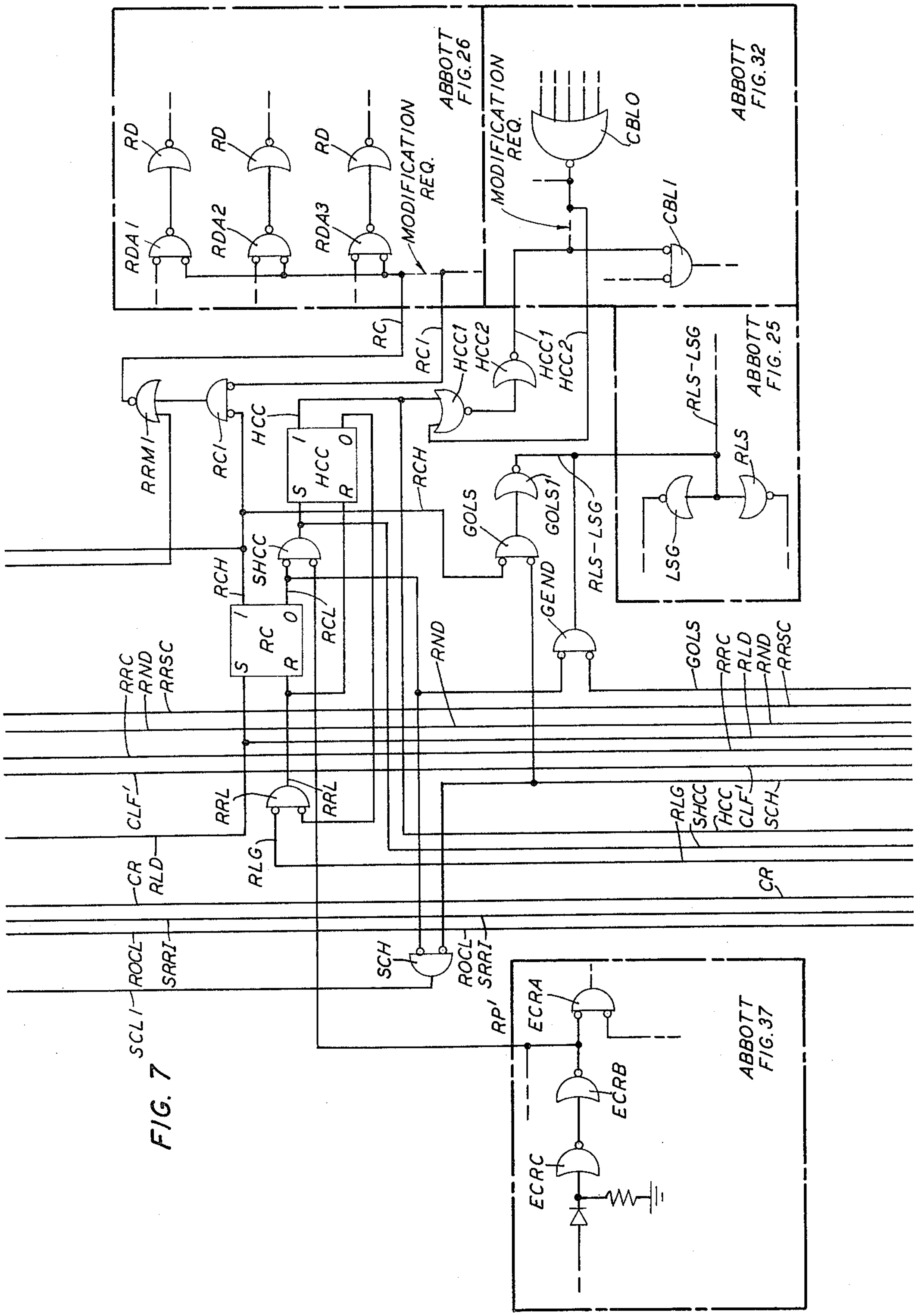
Figure 8:
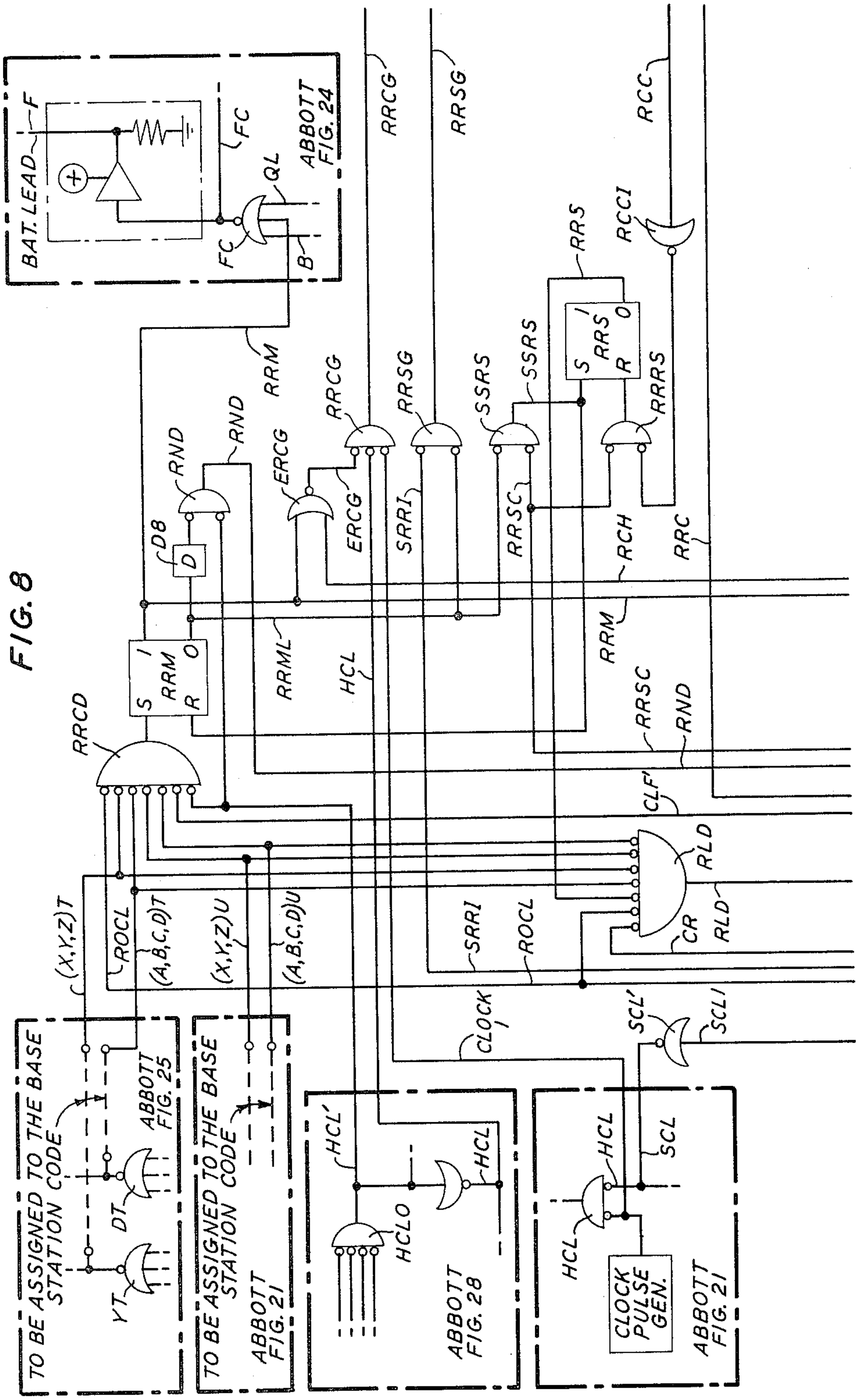
Figure 9:
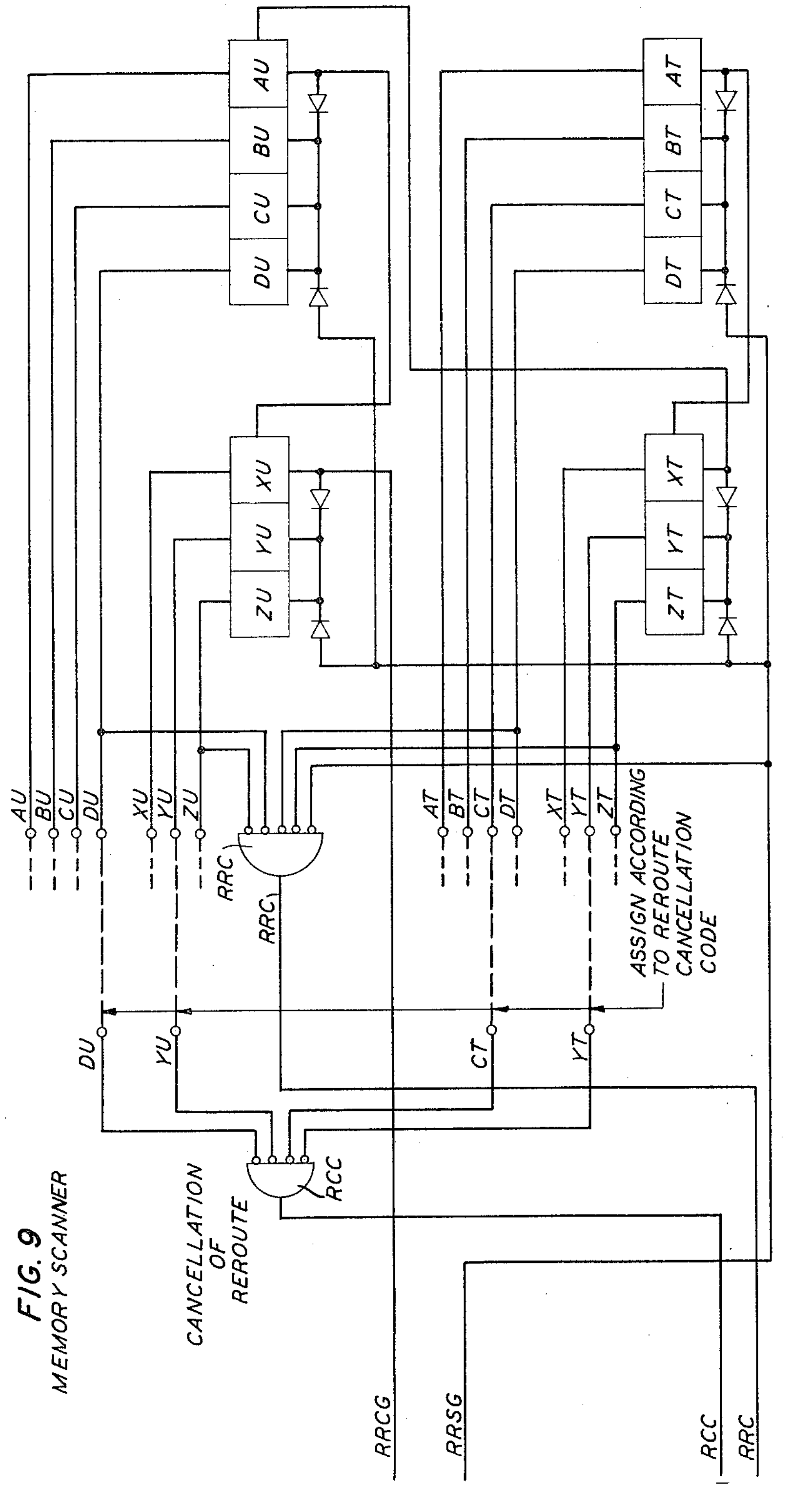

The foregoing and other objects and features of this invention may be more fully understood from the following description when read with reference to the drawing, in which:

FIG. 1 comprises a block diagram to illustrate how the invention may be used in conjunction with a known switching system such as for example that disclosed in U.S. Patent 3,377,432 to H. H. Abbott et al. of Apr. 9, 1968; the dashed outline blocks set forth the pertinent portions of the known system and the solid outlined blocks set forth a control arrangement which integrates into the known system to produce a specific embodiment of the invention;

FIG. 2 describes the manner in which FIGS. 3 through 9 are to be organized;

FIG. 3 described a part of the reroute common control used to detect a request for call reroute service and the memory for storing that request;

FIG. 4 further describes a part of the reroute common control for resetting the register circuit to the dial tone mode;

FIG. 5 describes a part of the reroute common control for detection and storage of the reroute disabling code;

FIG. 6 describes a part of the reroute common control which acts on instructions from any local control and detection circuit (combined FIGS. 7, 8 and 9) to reset the line scanner of the Abbott et al. marker; this figure also shows the detection circuit used to determine the reset code of the line scanner;

FIG. 7 describes a part of the local control and detection circuit for controlling the Abbott et al. marker while the remote station code is transmitted to and from the Abbott et al. marker circuit line scanner;

FIG. 8 describes a part of the local control and detection circuit used for detection of the base station address while on stand-by; and FIG. 9 describes a part of the local control and detection circuit for storing the remote station addresses and for detection of the reroute cancellation code.

The call reroute arrangement and the call disabling controls are functional parts of a common control switching system. Therefore this disclosure is not complete unless some of the pertinent common control operations are discussed. To work with this specific embodiment of the invention a particular switching system is selected and is by this reference incorporated as part of this disclosure. The selected system is disclosed in the aforementioned Abbott et al. patent referred to hereinafter as Abbott et al. The delineation between Abbott et al. and the disclosed circuit is shown in FIG. 1, wherein the former is shown in solid outline and the latter is shown in dashed outline.

At various times in this disclosure the operation of Abbott et al. is important, or the effect the disclosed circuit has on Abbott et al. is important. Therefore whenever necessary the pertinent portion of Abbott et al. is shown in the drawing accompanying this disclosure and identified by the figure number used in Abbott et al.

The basic logic circuits used in Abbott et al. are the same type logic circuits employed in this disclosure. These logic circuits are shown in FIGS. 4 through 10 inclusive of Abbott et al. To aid in understanding this disclosed embodiment the same symbolic representation is adopted in the drawing.

Frequently, a reference is made in the detailed disclosure to a LOW or a LOW signal. Either of these terms is used interchangeably to describe the signal generated by a connection to the grounded terminal of a battery or power supply. Also the terms HIGH and HIGH signal are used interchangeably to describe the signal generated by a connection to a positive terminal of the same battery or power supply. As this system contemplates the use of (TRL) transistor-resistor logic units employing Western Electric 12 type and 16 type transistors, the positive potential is approximately 20 volts positive with respect to ground reference. This invention is not limited by the specific parameters outlined above and it would be obvious to one skilled in the art to substitute different parameters and accomplish the same result.

The detailed discussion focuses on the marker and register operation of the Abbott et al. system and to a lesser degree on the line circuit operation. The reroute common control comprising FIGS. 3, 4, 5 and 6 is associated with all registers and the common control of Abbott et al. The local control and detection circuit is also associated with the common control of Abbott et al. Referring to FIG. 1, local control and detection circuitry is shown associated with station 89 and station 10 to provide these line circuits with the call rerouting feature. Line circuit 88 is typical of those stations not arranged for call rerouting. The call reroute system provides one reroute common control to work with all the local control and detection circuits thereby to provide in a common place some of the more routine call rerouting circuit functions.

The subsequent discussion may be divided into three areas of operation which are storage of the reroute number primarily involving FIGS. 3, 4 and 6, disabling call reroute primarily involving FIGS. 4, 5 and 6, and finally call reroute cancellation involving FIGS. 8 and 9.

STORAGE OF REROUTE NUMBER

Under this heading the emphasis is placed on the storage of a remote station address code in the memory individual to the base station. That memory is shown in FIG. 9 and is part of the local control and detection circuit associated with the base station. For obvious reasons, one of which is to prevent interference with the call reroute arrangement, the ability to store the address code is solely under control of the base station.

In general terms, storage of the reroute number proceeds as follows. The base station desirous of placing that station address code on stand-by, i.e., a station which desires to cause a call reroute effecting his telephone address, signals the register circuit by lifting his telephone receiver off-hook. The register circuit acknowledges the connection by returning dial tone to the base station. A special address code is assigned to this request. Since the Abbott et al. system operates basically with a two-digit address per station the special address code is conveniently a two-digit address. Upon receipt of the address code the register requests connection to the common control in a normal fashion for translation of the dialed address into a terminal location. However, the reroute common control which is monitoring the digits transmitted to the common control by all registers detects the special address code early in the common control operation. The reroute common control stops further progress of the switching system common control and signals that circuit to release. At the same time the reroute common control stores in its memory associated with this register a mark to indicate that the special address code has been dialed. The last operation before release by the reroute common control is to restore the register to the dial tone mode. Restoring a register to the dial tone mode means, in this case, that the stored digits previously dialed are erased, dial tone is returned to the base station and the register is prepared to receive two more digits.

When the base station hears the second dial tone the base station remains off-hook and continues to dial the address code of the remote station, i.e., the station address to which all future incoming calls are to be routed. Once again, upon receipt of this address code the register connects to common control in a normal fashion looking once more towards a possible terminating connection. However, the reroute common control having stored and identified the earlier request for storage of a remote station and further recognizing that this connected register had made that request, once again halts the switching system common control. During the subsequent operation the reroute common control manipulates the switching system common control as if that circuit were actually a part of the reroute common control circuit.

Specifically, the reroute common control circuit controls the switching common control in order to determine the base station address. This address code thereafter enables the reroute common control circuit to locate the particular local control and detection circuit assigned to the base station. When the particular local control and reroute circuit has been identified, the reroute common control causes the switching system common control to read out of the register circuit the remote station address code. Thereafter that address is registered in the local reroute circuit. Upon verification of the successful transfer of the address code, the reroute common control causes all the affected circuits to restore to normal and places the local control and detection circuit on stand-by.

Thereafter the local control and detection circuit monitors the switching common control circuit operation in order to change that circuit operation when the address code of the stand-by base station is registered therein. Particulars of this operation are covered under the heading "Call Reroute Operation."

Departing now from the general outline and concentrating on specific details, the Abbott et al. disclosure describes the means for detecting a line off-hook signal, the common control operation for connecting a register resulting from the detection of that signal, and, further, the register operation following the dialing of the special address code. The details of these circuit operations are disclosed in Abbott et al. under the titles "Detection of Line Circuit Service Request," "Line Scanning Operation," "Register Selection" and "Register Circuit."

Assuming that the special address code reserved to indicate the request for storage of a remote station number has been dialed and is in fact stored in the register circuit, the register makes a request for connection to the common control. When the common control is available, a connection is established between the common control and the particular register requesting service. Referring now to FIG. 16 of Abbott et al., the common control instructs the register to gate out the dialed information by a LOW signal on the RD-lead. The dialed information has been priorly stored in the register storage units identified as XU, YU, ZU, AU, BU, CU, DU, XT, YT, ZT, AT, BT, CT, and DT.

The LOW on the RD-lead causes the information stored in the storage units to be gated onto the input leads to the common control code lead amplifiers. In Abbott et al. the code lead amplifiers are shown on FIGS. 21 and 25. It should be noted at this point that the Abbott et al. register circuit converts the tens and units information into coded information. The code employed is a three-by-four code for a unit digit and a three-by-four code for the tens digit. Referring once again to FIGS. 21 and 25 of Abbott et al., the special address code converted into the dual three-by-four code activates one code lead amplifier of the XU–YU–ZU group and one of the AU–BU–CU–DU group as well as one of the XT–YT–ZT group and one of the AT–BT–CT–DT group.

Referring now to FIG. 3, pertinent portions of Abbott et al. FIGS. 21 and 25 are reproduced in the upper left-hand corner of the drawing. The outputs of the code lead amplifiers are here associated with cross-connection terminals. The output of every code lead amplifier is modified to provide a cross-connect terminal in order that the reroute circuits might be conveniently connected to detect the address code being processed by common control. The two code lead amplifiers designated XT and AT are representative of the seven code lead amplifiers. It is intended that appropriate cross-connections be made to the outputs of the code lead amplifiers so as to detect the reroute service request. Due to the code conversion described elsewhere, two leads are required between Abbott et al. FIG. 25 and gate ACD to define the tens digit and two additional leads are required between Abbott et al. FIG. 21 and gate ACD to define the units digit of the address code assigned to the reroute service request. When all four input leads from the code lead amplifiers are LOW, indicating the presence of the address code, gate ACD is turned off making lead ACD HIGH. The HIGH output of gate ACD enables inverting gate ACI which in turn makes lead ACI LOW. The LOW on lead ACI is connected to the three gates designated ACR1, ACR2, and ACR3. However, only one of these gates will turn off corresponding to the particular RD-lead which is LOW at this time.

The pertinent portion of Abbott et al. FIG. 26 is reproduced in FIG. 3. Corresponding to the particular register connected to the common control, one of the three RD-leads is LOW at this time. Lead RD1 reflects the state of register 1, and leads RD2 and RD3 the states of registers 2 and 3 respectively. Assuming the common control is connected to register 1, lead RD1 is LOW at this time. Since there is ground on leads AC1 and RD1, gate ACR1 turns off thus causing flip-flop ACM1′ to be set. Flip-flop ACM1′ remains set to record the fact that register 1 has priorly recorded the dialed address corresponding to a reroute service request.

Referring back to lead ACD which was made HIGH when gate ACD turned off, lead ACD is extended from FIG. 3 to FIG. 4 enabling gate RLG and making lead RLG LOW. Leads RDA1, RDA2 and RDA3, shown leaving Abbott et al. FIG. 26 on FIG. 4, provide the same indication as leads RD1, RD2 and RD3 shown on FIG. 3 which, as described earlier, is to indicate the particular register number which is now connected to the common control. Register 1 is connected to common control at this time, thereby lead RDA1 will be LOW. Since lead HCC is also LOW at this time as discussed elsewhere, gate RR1 is turned off thus making lead RR1 HIGH.

Circuit conditions are now prepared whereby register 1 is signaled to reset the steering circuit to restore the counters and to return dial tone to the calling subscriber. The HIGH on lead RR1 is inverted by gate RR1I to a LOW signal and transmitted over a lead RR1I to the register as shown in Abbott et al. FIG. 17, the pertinent part of which is reproduced in FIG. 4. This LOW on lead RR1I operates relay DT thus reconnecting dial tone to the calling subscriber's line. Further, the HIGH on lead RR1 turns on gate RRSC which turns off gate RCLF through a delay network D1. This delay is necessary in order to ensure the operation of relay DT in register 1 before gate RCLF turns off. The counters and steering circuit of register 1 are reset by a HIGH on lead RR1. This HIGH may be traced through diode R to Abbott et al. FIG. 16 wherein the memory units of register 1 are reset thereby erasing the stored dialed address. This HIGH may also be traced over a path including diode R′ to Abbott et al. FIG. 17 wherein the steering circuit is reset.

The common control is restored to normal when the HIGH on lead RCLF (FIG. 4) resulting from turn off of gate RCLF is transmitted to the common control as shown in Abbott et al. FIG. 37. Details concerning the reset operation of common control which has just been activated by the operation of gate RCLF can be found in the Abbott et al. disclosure under the heading "Reset Circuit."

When the register is restored to normal by the HIGH signal on lead RR1, the outputs of the code lead amplifiers are restored to their normal HIGH signal condition thus reoperating gate ACD in FIG. 3. When gate ACD reoperates all circuits restore to normal excepting flip-flop ACM1′ which remains in the set condition. With one exception flip-flop ACM1′ will not be reset until the same register is connected once again to the common control. The exception occurs when the base station disconnects from the register before a reconnection of the register to the common control. Under these conditions lead SUPV1 shown on FIG. 3 connecting to Abbott et al. FIG. 18 becomes HIGH thus resetting flip-flop ACM1′. When a register is abandoned by a calling subscriber, a HIGH is generated by the gate SUPB shown in the pertinent portion of Abbott et al. FIG. 18, reproduced on FIG. 3. This HIGH is then generated along lead SUPV1 to reset flip-flop ACM1′.

After the common control is reset and register 1 is restored to the dial tone mode, dial tone is returned to the base station subscriber. This dial tone signal instructs the subscriber to continue dialing the address code of the remote station. When the remote station address is received by register 1 the common control is signaled for connection. When register 1 is preferred, a connection is established to the common control whereby lead RD1 shown in FIG. 3 coming from Abbott et al. FIG. 26 becomes LOW for the second time. The LOW on lead RD1 turns off gate SCLF1. Gate SCLF1 was not turned off on the first register connection because of delay network D2 interconnecting the ACM1′ flip-flop "0" state and one input of gate SCLF1. The delay network delayed the signal sufficiently long so that lead RD1 had restored to normal before the LOW propagated to gate SCLF1. However, on this subsequent connection the LOW from flip-flop ACM1′ is on the gate SCLF1 and thus that gate turns off when lead RD1 becomes LOW. The output of gate SCLF1 resets flip-flop ACM1′ and sets flip-flop CLF. The operation of flip-flop CLF signifies the beginning of the "callback" operation of common control used here to identify the base station requiring the storage of the remote station number. The "1" state of flip-flop CLF is HIGH resulting in a HIGH signal over lead CLF to gate CBLO shown in Abbott et al. FIG. 32, the pertinent part of which is shown in FIG. 3. The operation of gate CBLO in Abbott et al. FIG. 32 common control begins the common control callback operation.

During the callback operation, the common control causes a special signal to be placed on the calling line via the connected register. At the same time the line scanner of the common control is started, searching for this special signal. When the signal is detected, the line scanner is stopped at a scan position which is equivalent to the address of the calling subscriber. As part of the callback operation of the common control, the register circuit which had been priorly gated onto the line scanner is disconnected from the line scanner in order that the line scanner may be used to identify the calling subscriber.

When the common control has identified the subscriber, lead HCL′ from Abbott et al. FIG. 28 in FIG. 8 will be LOW. FIGS. 7, 8 and 9 constitute the local control and detection circuits assigned to base station 89. Assuming that station 89 is the originating station, then the callback operation results in making the four leads connecting gate RRCD with Abbott et al. FIGS. 25 and 21 shown on FIG. 8 LOW. Similar to the assignment discussed earlier in association with the operation of gate ACD (FIG. 3), leads (X, Y, Z) T, (A, B, C, D) T, and (X, Y, Z) U and (A, B, C, D) U are cross-connected to the appropriate code lead amplifier output to detect the address of station 89. All seven inputs to gate RRCD are LOW at this time, four of them being LOW because the base station address was detected, one being LOW since flip-flop CLF (FIG. 3) is set, another one because lead HCL′ from Abbott et al. FIG. 28 in FIG. 8 is LOW indicating end of scan, and the last input because lead ROCL is LOW. Gate RRCD turns off transmitting a signal to set flip-flop RRM. Setting flip-flop RRM signifies the beginning of the transfer of the dialed remote station address, presently stored in register 1, to the memory associated with this local control and detection circuit.

In preparation for the transmission of the stored information at a later time, the HIGH on the "1" state of flip-flop RRM turns on gate ERCG over lead RRM which in turn causes one input of gate RRCG to become LOW. By this action gate RRCG is placed under control of the clock pulse generator signals on lead CLOCK 1 from Abbott et al. FIG. 21 and the line scanner control signals on lead HCL from Abbott et al. FIG. 28. The HIGH on lead RRM may be also traced from FIG. 8 to FIG. 7 turning on gate RRM1 thereby causing a LOW signal to be generated on lead RC to common control. Referring to Abbott et al. FIG. 26, a portion of which is reproduced on FIG. 7, the LOW on lead RC causes one of three gates to operate. Gate RDA1 operates since register 1 is connected to the common control at this time. The LOW signal on lead RC is eventually propagated through common control to result in a signal to register 1. In response to this signal register 1 connects the output of its storage units to the input of the code lead amplifiers. Returning to FIG. 8, the HIGH on lead RRM is also transmitted to Abbott et al. FIG. 24, a portion of which is shown on FIG. 8, to turn on gate FC thereby removing the F voltage from the line circuits of the system to prevent interference during the subsequent line scanner operation.

When the LOW on lead RC resulted in the connection of the register to the code lead amplifiers, the line scanner was reactivated. It will be remember that the previous operation of the line scanner dealt with the callback sequence and, further, that the line scanner had stopped because the calling line had been located. However, when the new information from register 1 is gated onto the code lead amplifiers the prior circuit conditions are changed such that the scanner begins once again to operate. This reoperation is inherent in the arrangement of the control circuit which drives the line scanner. Under the circumstances where the F voltage is removed from all line circuits, the register information is gated onto the code lead amplifiers, and the line scanner is started, the line scanner continues to run until the position of the line scanner corresponds to the address of the remote station stored within the register.

At this time attention is directed to the output of flip-flop RRM (FIG. 8) corresponding to the LOW "0" state. When flip-flop RRM was set, lead RRML was made LOW. This LOW signal is propagated through a delay network D8 to gate RND. This delay network is of such a character that the LOW signal will be sufficiently delayed to prevent operation of gate RND until such time as lead HCL′ from Abbott et al. FIG. 28 is LOW a second time. The reason for this will become apparent in the subsequent discussion. Further, the LOW on lead RRML enables gate RRSG to turn off when lead SRRI becomes LOW and also enables gate SSRS to turn off when lead RRSC becomes LOW.

As discussed above, the line scanner stops when the code on the line scanner matches the code of the remote station stored in the register. At that time lead HCL′ becomes LOW for a second time indicating that the scanner has stopped. The LOW signal on lead HCL′ turns off gate RND which in turn causes lead RND to become HIGH. The HIGH signal on lead RND is propagated from FIG. 8 of the local control and detection circuit to FIG. 6 of the reroute common control circuit setting flip-flop COI.

The setting of flip-flop COI signifies the beginning of the transfer of the remote station address code stored in the line scanner of common control to the memory unit of the local control and detection circuit shown on FIG. 9. In general terms, this transfer is accomplished by pulsing the common control line scanner until the output position of the line scanner is at the rest position. Coincident with the line scan operation the pulses of the clock pulse generator also drive the memory scanner shown on FIG. 9 of the local control and detection circuits. The memory scanner shown on FIG. 9 is identical to the common control line scanner except it is arranged to run in reverse order; effectively it is running from the reset position or rest position back to the number that was stored in the line scanner.

Referring back ot FIG. 6, the "1" state of flip-flop COI is HIGH. This HIGH signal causes a positive voltage to be impressed across the network associated with transistor STRS. The network transforms the voltage transition from LOW to HIGH to a pulse thereby causing a momentary operation of transistor STRS. Recalling that lead RND is HIGH thus inhibiting gate SLS, the LOW pulse generated by the operation of transistor STRS turns off gate SRR for the pulse duration. The other input to gate SRR from lead RLD is LOW at this time. Gate SRR transforms the LOW pulse to a HIGH pulse which is in turn converted back to a LOW pulse by inverting gate SRRI. Thereafter the pulse is transmitted over lead SRRI from FIG. 6 to FIG. 8 to turn off gate RRSG for the duration of the pulse. The other input to gate RRSG is LOW at this time since flip-flop RRM is set.

Gate RRSG will operate for the duration of the pulse generated by the network in FIG. 6 and during that interval will cause lead RRSG to go HIGH. The HIGH on lead RRSG will disable gate RRC in FIG. 9 by making one of the inputs HIGH and also will reset the memory scanner to the rest position. At the end of the pulse all the gates involved in propagating the pulse are restored to their original states, thus making lead RRSG LOW removing the reset pulse from the memory scanners shown on FIG. 9.

Also in preparation for the transfer of information, lead SCH is LOW when flip-flop COI is set. This lead may be traced from FIG. 6 to FIG. 7 wherein it turns off gate GOLS. The other input to gate GOLS is LOW since flip-flop RC is not set. Gate GOLS turning off generates a HIGH which is inverted by gate GOLS1. This LOW is transmitted to Abbott et al. FIG. 25, pertinent parts of which are shown on FIG. 7, over lead RLS-LSG to cause the line scanner to be disconnected from the code lead amplifiers.

When the line scanner is disconnected from the code lead amplifiers by the LOW signal on lead RLS-LSG to the Abbott et al. FIG. 25, the circuit conditions in common control which caused the line scanner to stop the last time are altered, causing the line scanner to be pulsed by the clock pulse generator. Coincident with the above changes in common control, lead HCL shown on FIG. 8 coming from Abbott et al. FIG. 28 is LOW. Referring to gate RRCG on FIG. 8, two of the inputs are LOW, one described elsewhere as the result of the output of gate ERCG and a second input from lead HCL. The third input to gate RRCG is connected over lead CLOCK 1 to Abbott et al. FIG. 21. Lead CLOCK 1 is connected in common control to the output of the clock pulse generator. This clock pulse generator is the same generator that drives the line scanner. Therefore, in response to the LOW pulses being generated on lead CLOCK 1 by the clock pulse generator gate RRCG turns off and on.

Referring now to the memory scanner on FIG. 9. designated ZU, YU, XU, DU, CU, BU, AU and to the corresponding tens memory units designated ZT, YT, XT, DT, CT, BT, AT, this circuit arrangement consists of two three-stage ring counters and two four-stage ring counters arranged to be identical to the line scanner of Abbott et al. The difference beween the memory scanner and the common control line scanner arrangement is that the former is arranged to pulse in reverse order which is accomplished by designating the ring counters stages backwards. Since a complete description of this circuit operation is contained under the heading "Line Scanner" in the Abbott et al. disclosure, it is sufficient to state that the HIGH signals on lead RRCG cause the memory scanner to step in unison with the line scanner. As stated earlier, the object is to run the line scanner until the line scanner reaches the rest state.

Referring now to FIG. 6, gate ESL shown on Abbott et al. FIG. 25, part of which is reproduced in FIG. 6, is turned off when all four input gates representing the rest position of line scanner are LOW. The same four leads are extended to turn off gate LSRC. thereby causing lead LSRC to become HIGH. Lead SLS is LOW at this time. The end of scan signal signifies the completion of the transfer of the remote station address from the register through the line scanner to the memory scanner in FIG. 9. The HIGH on lead LSRC begins the release sequence of the reroute common control and resets flip-flop COI. Lead LSRC can be traced from FIG. 6 to FIG. 4 wherein it operates gate RLG causing lead RLG to be LOW. LOW on lead RLG resets flip-flop CLF shown on FIG. 3 and, as described elsewhere, resets register 1 to the dial tone mode and resets the common control.

During the time reroute common control is restoring to normal, the local control and detection circuit is placed in the stand-by position. It will be recalled that during the prior operation flip-flop RRM shown on FIG. 8 was set causing one of the inputs to gate SSRS to be LOW. Referring to FIG. 4, gate RRSC is turned on by the HIGH on lead RR1, causing lead RRSC to be LOW. This LOW may be traced from FIG. 4 to FIG. 8 to turn off gate SSRS thereby to make lead SSRS HIGH. This HIGH sets flip-flop RRS and resets flip-flop RRM. Flip-flop RRS set signifies that the local control and detection circuit is in the stand-by position.

When the register is restored to normal by the operation of gate RLG as discussed elsewhere, dial tone is returned from the register to the base station. This dial tone signal informs the base station that the address code of the remote station has been stored in the reroute register and that the reroute register is now on stand-by. When the base station subscriber places his telephone receiver on the switch hook the register will be restored to normal.

CALL REROUTE OPERATION

In general terms, call reroute operation refers primarily to the stand-by monitoring operation of local control and detection circuits wherein these circuits determine when a terminating connection processed by common control is directing a connection to the base station. Subsequent to the detection of the base station address, the remote station address is transferred from the memory scanner of the local control and detection circuit to the common control, replacing the base station address stored therein. After common control locates the terminal of the remote station, the remote station address is transferred back to the memory scanner of the local control and detection circuit.

In the early stages of a common control terminating connection, the called station address appears on the code leads associated with the code lead amplifiers. As discussed in Abbott et al., the address dialed by the calling station is stored in the register. After the register is connected to common control, the register circuit transmits the called station address to the code lead amplifiers of the common control. The output of the code lead amplifiers, the "code leads," are monitored by individual local control and detection circuits. Herein, as discussed earlier, a single local control and detection circuit comprising FIGS. 7, 8 and 9 is shown in detail.

Referring now to FIG. 8, gate RLD monitors certain code leads to determine the base station address. Assuming this local control and detection circuit is associated with station 89, the four leads designated (X, Y, Z) T, (A, B, C, D) T, (X, Y, Z) U and (Z, B, C, D) U are cross-connected in Abbott et al. FIGS. 21 and 25 to the output of the scanner position associated with station 89. As discussed elsewhere, the address information is converted by the register circuit from a decimal system to a coded system of two groups of three-by-four signals. Therefore, to detect the address, four leads are required.

When the address of the base station is on the code leads, all four leads are LOW thus enabling the respective inputs to gate RLD. As discussed elsewhere, flip-flop RRS is set indicating a stand-by condition and causing lead RRS to be LOW. Lead CR (FIG. 8) is LOW at this time because there has been no reroute disabling signal. Finally, lead ROCL is LOW to indicate that common control is processing a terminating connection. The detailed reasons for the LOW signal on lead ROCL are developed elsewhere. With all inputs LOW, gate RLD turns off, making lead RLD HIGH.

The HIGH on lead RLD is propagated to FIG. 7 setting flip-flop RC thus setting the stage for the transfer to the common control line scanner of the stored remote station adddress presently stored in the memory scanner of FIG. 9. Setting flip-flop RC makes the associated "1"

state HIGH. This HIGH may be traced over lead RCH from FIG. 7 to FIG. 8 where gate ERCG is turned on and lead ERCG is made LOW. This operation is prelimary to placing the memory scanner (FIG. 9) under control of the clock pulse generator of the common control. The HIGH signal on lead RCH also turns on gate RC1 in FIG. 7 which in turn turns off gate RRM1 to generate a HIGH on lead RC to Abbott et al. FIG. 26 shown on FIG. 7. Because of the circuit configuration of gates RC1 and RRM1, prior to turn on of gate RC1 the signals on lead RC were controlled by the signals on lead RC1.

As shown in Abbott et al. FIG. 26, the pertinent part of which is reproduced on FIG. 7, the normal control path for gates RDA1, RDA2 and RDA3 is modified. This modification consists of breaking into the control lead, designated A', running out to the FIG. 7 lead RC1, and returning from the FIG. 7 lead RC. A LOW on lead A' before the modification generated a signal to the connected register circuit to gate out the called information stored therein and transmit that information to the common control code lead amplifiers. However, because of the modification, the local control and detection circuit is capable of interrupting that signal thereby causing the register circuit to disconnect the priorly connected re mote station address from the code lead amplifiers.

Flip-flop RC, being set, also generates a LOW signal on lead RCL. The LOW signal on lead RCL makes LOW one input to gate SCH preparatory to turning off this gate when flip-flop COI of FIG. 6 is set. In addition, one input of gate SHCC of FIG. 7 is LOW placing gate SHCC under control of lead R' to Abbott et al. FIG. 37.

The HIGH on lead RLD, in addition to setting flip-flop RC as discussed above, is propagated from FIG. 8 to FIG. 6 setting flip-flop COI and making HIGH one input of gate SRR of FIG. 6. In this manner gate SRR is prevented from operating when transistor STRS pulses as a result of the setting of flip-flop COI. Operation of flip-flop COI signifies a beginning of the tarnsfer of the stored information in memory scanner to the line scanner. The network interconnecting the "1" state of flip-flop COI and transistors STRS generates a HIGH pulse, causing transistor STRS to momentarily operate. The resultant LOW pulse signal on the collector of transistor STRS causes gate SLS to turn off thereby transmitting a HIGH signal over lead SLS to Abbott et al. FIG. 21. The HIGH signal on lead SLS also inhibits one input to gate LSRC thereby making that gate insensitive to end of scan signals coming from Abbott et al. FIG. 25. In the common control circuit the HIGH pulse on lead SLS causes the line scanner to be reset.

Setting of flip-flop COI also makes lead SCH LOW. This LOW signal on lead SCH is propagated from FIG. 6 to FIG. 7 to gate SCH. It will be remembered that flip-flop RC is set at the present time. Therefore, both inputs to gate SCH are LOW turning off gate SCH which in turn puts a HIGH signal on lead SCL1. The HIGH signal on this lead is propagated from FIG. 7 through the inverting gate SCL' to lead SCL of FIG. 8 to gate HCL shown in Abbott et al. FIG. 21. This LOW signal begins the common control line scanner operating by gating the clock pulse generator onto the line scanner. When the gating connection is effective a LOW signal is returned from the common control over lead HCL shown on FIG. 8 coming from Abbott et al. FIG. 28. That LOW signal is propagated to gate RRCG. Because gate ERCG has been priorly operated, gate RRCG is now under control of the clock pulse signals coming from Abbott et al. FIG. 21 over lead CLOCK 1. The LOW pulses on lead CLOCK 1 are repeated through gate RRCG and are reproduced on lead RRCG as HIGH pulses. As explained elsewhere, pulses on lead RRCG cause the memory scanner shown in FIG. 9 to advance step by step in accord with each pulse.

The line scanner continues to operate under control of the clock pulse generator in unison with the memory scanner until the rest code is detected on the output leads of the memory scanner. Referring now to FIG. 9, leads DU, ZU, DT, and CT are all LOW when the memory scanner has advanced to the rest position. Lead RRSG is LOW at this time because one input to gate RRSG, namely lead SRRI, is HIGH. Since all the inputs to gate RRC are LOW, gate RRC turns off making lead RRC HIGH. This lead may be traced from FIG. 9 to FIG. 6 resetting flip-flop COI. The resetting of flip-flop COI indicates that the position of the common control line scanner corresponds to the remote station address. The reset state of "0" position of flip-flop COI causes lead SCH to be HIGH. A path can be traced over lead SCH including gate SCH on FIG. 7 and inverter gate SCL' on FIG. 8 restoring lead SCL to a HIGH. This action causes the clock pulse generator to be gated off the line scanner and thus the line scanner is halted. Resetting flip-flop COI also causes lead GOLS to be LOW. A path may be traced from FIG. 6 over lead GOLS to FIG. 7; thereby one input to gate GEND is LOW. It will be recalled that flip-flop RC is still set at this time; therefore the other input to gate GEND is LOW. Gate GEND turns off making lead RLS-LSG HIGH, signaling the common control shown in Abbott et al. FIG. 25 to gate the line scanner onto the code lead amplifiers.

The goal achieved by this prior operation was the substitution for the register connected leads to the code lead amplifier, the output of the line scanner which contains the remote station address. Common control continues to process the call until such time as the terminal has been identified and the connection begins to be established through the switching network. When the line scanner is no longer required to retain the remote station address to complete the connection, lead RP' shown on FIG. 7 from Abbott et al. FIG. 37 becomes LOW. It will be remembered that flip-flop RC is still set at this time. Both inputs to gate SHCC are LOW causing gate SHCC to turn off thereby setting flip-flop HCC. A path may be traced from the output of gate SHCC to set flip-flop COI once again over lead SHCC.

At this point in time common control is nearing the end of its normal operation, therefore the operation of flip-flop HCC functions to halt the common control until such time as the address stored in the line scanner can be retransmitted to the memory scanner of FIG. 9. In common control the operation following the identification of the terminal is the callback operation. During that operation a LOW signal is passed from common contol gate CBLO to the common control gate CBL1, both of which are shown in Abbott et al. FIG. 32 reproduced in FIG. 7. The path connecting these gates is interrupted and the leads are extended to FIG. 7 in order that the flip-flop HCC may exert control over this path. Setting flip-flop HCC makes lead HCC HIGH. This HIGH is propagated through gates HCC1 and HCC2 making lead HCC1 HIGH thereby holding gate CBL1 turned on. In addition to interrupting this path, operation of flip-flop HCC also prepares a path to reset flip-flops RC and HCC by placing a LOW on one input of gate RRL.

As described above, flip-flop COI is set setting up the necessary conditions for transfer of the remote station address from the line scanner to the memory scanner. The method of transferring this information has been covered in detail under the heading "Storage of Remote Station Address." It is only important here to note that the HIGH on lead SHCC holds gate SLS operated and that gate SRR will respond to the pulse generated by transistor STRS. When the information has been successfully transferred from the line scanner to the memory unit and the circuits are restoring to normal, as described elsewhere, lead RLG becomes LOW, a path may be traced over lead RLG from FIG. 4 to FIG. 7 whereby gate RRL is turned off. It will be recalled that the other input to gate RRL is LOW because flip-flop HCC is set at this time. When gate RRL turns off, lead RRL is HIGH thereby resetting flip-flops RC and HCC. This action restores the local control and detection circuit to normal and allows the common control to continue to progress the call to completion.

CALL REROUTE CANCELLATION

Under this heading the method and means for canceling call reroute and restoring the base station to normal are discussed. The procedure followed is similar to that followed for storing the remote station address. the base station subscriber dials the same special address discussed under "Storage of Reroute Number" thereby preparing the reroute common control to receive what initially appears to be a remote station address.

The subscriber continues to dial the cancellation code which is in fact a two-digit address code. The reroute common control and local control and detection circuit function just as though a remote station address were dialed. In other words, the cancellation code is stored in the memory scanner shown on FIG. 9. Thereafter the code is detected and the cancellation is effective.

As discussed, there is no departure from the described operation for storage of reroute number but in fact an additional operation activated by the particular number dialed. Referring now to FIG. 9 and specifically to gate RCC, it will be observed that gate RCC has four inputs. Similar to the manner described elsewhere for cross connection of the output of the code lead amplifiers, the inputs to gate RCC are cross-connected to output positions of the memory scanner. By this cross-connection procedure the cancellation code is flexible and may be changed at will. Assuming now that the cancellation code has been dialed and the cross-connection shown on FIG. 9 is cross connected so as to detect such a code, all inputs to gate RCC will be LOW. With all inputs to gate RCC LOW, gate RCC turns off making lead RCC HIGH. A path may be traced from FIG. 9 to FIG. 8 over lead RCC to gate RCC1. Gate RCC1 functions to invert the signal on lead RCC so that the resultant operation of gate RCC places a LOW signal on the input of gate RRRS. It will be remembered that the input to gate RRRS from lead RRSC is LOW while a register is connected to common control. With both inputs to gate RRRS LOW, this gate turns off causing a reset pulse to be transmitted to reset flip-flop RRS. As described elsewhere, flip-flop RRS is normally in the set position when the local control and detection circuit is on stand-by. Resetting of flip-flop RRS by the described operation above causes this particular local control and detection circuit to be taken off stand-by thereby cancelling priorly set up call reroute conditions for this line terminal.

DISABLING CALL REROUTE

At this time it is opportune to discuss a feature of the invention whereby a calling subscriber may temporarily disable the local control and detection circuit. To accomplish this end a reroute disabling code is dialed prior to the dialing of the called station address. This code is identified by the reroute common control and a mark is stored. Thereafter that mark disables the particular local control and detection circuit which would normally be effective to cause a reroute.

Although this description teaches that the disabling mark is dialed by a subscriber, it will be understood that that is not the sole means of producing the mark. It should be obvious to those skilled in the art that the signal could be generated by a wire connected to the local control and detection circuit at one end and to a key at the other end thereby to produce such a mark at will. It is also obvious that a subscriber could generate dial pulses at a distant office and that these signals would be repeated to the local control and detection circuit by way of a dial pulse sender. Also, the subscriber can be replaced by a preprogrammed computer which is capable of generating the correct dial pulses.

Referring now to FIG. 5, four of the five inputs of gate CRR are extended to Abbott et al. FIGS. 21 and 25, the pertinent parts of which are reproduced on FIG. 5. These leads are cross-connected to the outputs of the code lead amplifiers to enable gate CRR to respond when the reroute disabling code is present on the code leads. When this code has been dialed, all four leads to gate CRR will be LOW. Lead ROCL is LOW at this time, therefore detection of the code causes gate CRR to turn off thereby making lead CRR HIGH. Lead CRR may be traced from FIG. 5 to FIG. 4 turning on gate RLG thereby making lead RLG LOW. As discussed elsewhere, operation of gate RLG causes common control to be reset and the register to be restored to the dial tone mode.

Simultaneous with the signal to start the release of both common control and the register, a mark is stored associated with the register connected to the common control. This mark is stored as follows. When gate CRR is turned off the HIGH on lead CRR is inverted through inverting gate CR1 causing a LOW signal to be present on one of the inputs to each of gates CRR1, CRR2, and CRR3. Referring now to FIG. 3, one of the leads designated RD1, RD2 and RD3 is LOW corresponding to the particular register connected to common control. Assuming that register 1 is presently connected to common control, lead RD1 will be LOW at this time. Lead RD1 may be traced from FIG. 3 to FIG. 5 causing the other input of gate CRR1 to be LOW at this time thereby turning off gate CRR1 and setting flip-flop CRM1. Flip-flop CRM1 stores the mark indicating that register 1 has dialed a reroute disabling code. Note that gate CRLF1 is not affected by setting flip-flop CRM1 at this time because of the delay network D5 interposed between the gate and the flip-flop "0" state output. The delay period is sufficient to allow the LOW signal to be propagated to gate CRLF1 only after common control is reset and lead CRR1 is HIGH.

The dial tone returned to the calling subscriber indicates the reroute disabling code is stored. The calling subscriber may do one of two things at this point. He may either return his receiver to switch hook or continue to dial the code of the called number. If he does the former, flip-flop CRM1 is reset. Referring now to FIG. 3, the pertinent portion of Abbott et al. FIG. 18 is shown in the upper right-hand corner. When a subscriber is disconnected from a register, a HIGH pulse appears on lead SUPV'. This path may be traced from FIG. 3 to FIG. 5 over lead SUPV1 resetting flip-flop CRM1.

Assuming the calling subscriber continues to dial the two-digit address of the called subscriber, eventually a connection is established between that register and common control. As explained elsewhere, for each register connected to comon control one of three leads is LOW indicating the number of the register connected. Referring now to FIG. 3, and particularly to leads RD1, RD2, RD3, assuming register 1 is reconnected for a subsequent connection to the called subscriber, lead RD1 is LOW. A path may be traced from FIG. 3 to FIG. 5 over lead CRR1 turning off gate CRLF1. Turning off gate CRLF1 sets flip-flop CR and resets flip-flop CRM1. Setting flip-flop CR signifies the cancellation of call reroute during this common control operation.

It will be recalled that each local control and detection circuit which is in a stand-by condition monitors the output of the code lead amplifiers of the common control circuit thereby to detect the base station address and to begin a call reroute. Flip-flop CR functions to signal all local control and detection circuits in order to temporarily negate the stand-by condition.

Referring now to FIG. 5 and flip-flop CR, lead CR is HIGH. A path may be traced from FIG. 5 over lead CR to FIG. 8 whereby gate RLD is turned on to make gate RLD insensitive to the base station code during this common control operation. Thereafter common control completes the connection to the dialed address free of interference from any local control and detection circuit.

For convenience, the terminating connection processed by common control when the call reroute is disabled is called an override terminating connection. This term is not to imply the operation of common control is different in any respect from a normal terminating connection. The actual fact is that these connections do not in any way differ from one another except that the call reroute is disabled only during the override terminating connection.

Flip-flop CR of FIG. 5 is reset in the following manner. When the common control is restored to normal, all three of leads RD1, RD2, and RD3 shown on FIG. 3 will be HIGH. Paths may be traced from FIG. 3 to FIG. 5 over leads RD1, RD2, and RD3. The HIGH signals on these leads are inverted to LOW signals by gates OR1, OR2 and OR3, and in turn connected to gate OR. Because of this connection gate OR, normally turned off when the common control is not completing a terminating connection or otherwise idle, is turned on during the period the common control processes a terminating connection. In the instant case one of the three RD-leads was priorly LOW and has just been restored to a HIGH position. Therefore gate OR is turning off. The turn off of gate OR causes a pulse transition from LOW to HIGH on lead ROCL. This pulse transition is impressed on the network associated with transistor RCYCR. This network makes transistor RCYCR responsive only to pulse transitions from a LOW to a HIGH thereby creating a reset pulse to restore flip-flop CR. In this manner the reroute disabling means of FIG. 5 is restored to normal for subsequent use.

In the procedure outlined for signaling the call reroute disabling means, the disclosure described a reroute disabling code which was inserted ahead of the address of the called subscriber. Various other methods could be used to convey the same disable reroute signal such as frequency signaling, direct wire key means, and others which would be obvious to one skilled in the art.

It is understood that the above embodiment is merely exemplary and that various modifications may be made by those skilled in the art without departing from the spirit and scope of the invention. Moreover, although the disclosure details the operation of a single local control and detection circuit, it would be obvious to one skilled in the art to operate a similar system having a plurality of such circuits. It will be further understood that although the Abbott et al. switching system was chosen to describe the above embodiment, it was not intended to limit the invention. From the disclosure, it would be obvious that one skilled in the art could replace the Abbott et al. switching system with one of many well known common control switching systems and obtain the same results described herein.

What is claimed is:

1. In a switching system having a plurality of stations including at least a calling station and a called station and a different station, said calling station having signaling means for generating a disabling signal, a plurality of registers each of which is arranged to receive signals transmitted by said stations when a said station is connected to a said register and switching means controllable by said station to establish a connection between said station and a said register and controllable by said connected register when connected to said switching means to establish a connection between the said calling station and the said called station, the latter connection being a normal termination connection;

a call reroute arrangement comprising call reroute means enabled by a said register when connected to said called station to control the said switching means, said switching means effective when controlled to reroute calls directed to that called station, thereby to establish a reroute terminating connection between the said calling station and a said different station instead of the said normal terminating connection, and reroute disabling means comprising input means and comprising a plurality of resettable storage means associated with a like numbered plurality of said registers, the said input means controlled by a said register incident to the transmission thereto of said disabling signal, said input means effective when controlled to set said storage means associated with the said connected register, said storage means effective when set to disable said call reroute means in order that the said switching means is controllable to establish an override terminating connection between said calling station and said called station instead of the said reroute terminating connection.

2. The invention claimed in claim 1 wherein the said input means includes steering means controlled by said switching means and includes detection means, wherein said detection means is activated by any said register to generate a first output when the said register has received said disabling signal, and wherein said steering means is controlled by said switching means to steer the said first output to a particular one of the said plurality of storage means, said particular storage means associated with the said register receiving the said signal, thereby to result in the temporary disablement of the said call reroute means.

3. The invention claimed in claim 2 wherein the said reroute disabling means also includes restoring means, wherein said restoring means generates a second output when activated by said switching means incident to the connection of said register to said switching means, wherein each of said plurality of registers includes reestablishing means effective when activated to reset the said register to a dial tone mode, and wherein said steering means is controlled by said switching means to steer the said second output to the said register reestablishing means thereby to activate same.

4. The invention claimed in claim 3 wherein the said reroute disabling means also includes a plurality of resetting means, wherein each of said plurality of registers also includes control means and supervisory means and includes means to store an additional address code, wherein said supervisory means is activated upon a failure to receive the said additional address code after receipt of the said disabling signal to control said control means, wherein said control means is effective when controlled to activate one of said plurality of resetting means, and wherein said resetting means is effective when activated to reset said storage means associated with the said register, thereby to make ineffective said reroute disabling means.

5. In a switching system having a plurality of stations including at least a called station and a different station and a calling station with selectable signaling means, said signaling means selectable to generate signals representing called station addresses and special addresses, a plurality of registers each having signal storage means, a plurality of communication paths, a said register connected to a said calling station over one of said communication paths, switching means normally effective to establish a communication path between any two of said plurality of stations, a signaling path, connecting means controlled by said switching means when the said register signal storage means stores signals representing a called station address, and said connecting means is effective when controlled to establish a connection over said signaling path between the said register signal storage means and said switching means thereby to establish a path for transmission of said stored signals;

a call reroute arrangement comprising reroute common control means which includes first detection means and comprising a plurality of reroute local control means each of which includes inhibitable second detection means and memory means and transfer means, said memory means provides for storage of a said different station address and said transfer means controls the transfer of the said stored address to said switching means, said plurality of second detection means and said first detection means are connected to said signaling path and arranged to detect the said special address transmitted over said path, one of the said plurality of reroute local control means associated with the said called station and said associated second detection means is activated by the signals when the signals representative of the said called station are detected, said second detection means is effective when activated to activate said transfer means, said transfer means is effective when activated to transfer to said switching means from said associated memory means the address stored therein, whereby as a consequence the said switching means establishes a communication path between the said calling station and the said different station, said established connection being termed a reroute connection, and reroute disabling means including a plurality of bistable devices each of which is settable to a set or reset state, each of said devices associated with one of said plurality of registers, said bistable device associated with the said register is in a set state, the said device being set in the said set state during the last connection between the said register and said switching system during which time said first detection means was activated when the signal representative of a said special address was detected, thereafter said activated first detection means was effective to set the said bistable device to the set state, said reroute disabling means controlled by a combination of conditions, said conditions comprising the set state of the said bistable device and the said establishment of the said signaling path between the said register and said switching means, said reroute disabling means effective when controlled to inhibit every one of the said plurality of second detection means thereby to prevent establishment of a reroute connection.

6. The invention that is claimed in claim 5 wherein said reroute common control means also includes reroute resetting means, wherein said resetting means is controlled in one manner by the said register incident to disconnection of the said calling station from the said register, and wherein said resetting means is effective when controlled in said one manner to reset the said bistable device.

7. The invention that is claimed in claim 6 wherein the said reroute resetting means is also controlled in a different manner by said reroute disabling means incident to making effective said reroute disabling means, whereby the effectiveness of said reroute disabling means is limited to an override terminating connection between said calling station and said called station.

8. In a switching system having a plurality of stations including at least a calling station and a called station and a different station, and switching means controllable to establish a normal terminating connection by which a said calling and a said called station are interconnected;

a call reroute arrangement comprising call reroute means enabled by the said called station to control the said switching means to reroute calls directed to that called station, thereby to establish a reroute terminating connection between the said calling station and a said different station instead of the said normal terminating connection.

reroute disabling means controllable by the said calling station to disable said call reroute means in order that the said switching means may be controlled to establish an override terminating connection between said calling station and said called station instead of the said reroute terminating connection, signaling means at the said calling station for generating a disabling signal, said reroute disabling means being responsive to the said disabling signal to disable said call reroute means, and said reroute disabling means includes detection means and control means and resettable storage means, wherein said detection means is responsive to said disabling signal, said detection means is effective when responsive to set said storage means to store said disabling signal, and said storage means is effective when said signal is stored therein to activate said control means, thereby to result in the temporary disablement of the said reroute means.

9. The invention claimed in claim 8 wherein said reroute disabling means also includes resetting means that is energized by said switching means incident to establishing an override terminating connection, and wherein said energized resetting means resets the said storage means, thereby to result in disabling said call reroute means only during establishment of an override terminating connection.

References Cited

UNITED STATES PATENTS 2,924,664 2/1960 Nilsson et al.

KATHLEEN H. CLAFFY, Primary Examiner

T. W. BROWN, Assistant Examiner